US010437237B2

(12) United States Patent
Virtanen et al.

(10) Patent No.: US 10,437,237 B2
(45) Date of Patent: Oct. 8, 2019

(54) OPTIMIZATION OF A PROCESS

(71) Applicant: VALMET AUTOMATION OY, Espoo (FI)

(72) Inventors: Pasi Virtanen, Valkeakoski (FI); Jukka Pennanen, Tampere (FI); Juha Ojanen, Valkeakoski (FI)

(73) Assignee: VALMET AUTOMATION OY, Espoo (FI)

( * ) Notice: Subject to any disclaimer, the term of this patent is extended or adjusted under 35 U.S.C. 154(b) by 301 days.

(21) Appl. No.: 14/785,070

(22) PCT Filed: Apr. 17, 2014

(86) PCT No.: PCT/FI2014/050282
§ 371 (c)(1),
(2) Date: Oct. 16, 2015

(87) PCT Pub. No.: WO2014/170552
PCT Pub. Date: Oct. 23, 2014

(65) Prior Publication Data
US 2016/0070257 A1 Mar. 10, 2016

(30) Foreign Application Priority Data

Apr. 19, 2013 (FI) .................................... 20135404

(51) Int. Cl.
*G05B 19/418* (2006.01)
*G05B 13/04* (2006.01)

(52) U.S. Cl.
CPC ....... *G05B 19/41865* (2013.01); *G05B 13/04* (2013.01); *G05B 2219/32291* (2013.01); *G05B 2219/42155* (2013.01)

(58) Field of Classification Search
CPC .............. G05B 13/04; G05B 19/41865; G05B 2219/32291; G05B 2219/42155
See application file for complete search history.

(56) References Cited

U.S. PATENT DOCUMENTS 5,583,755 A 12/1996 Ichikawa et al.
5,841,652 A 11/1998 Sanchez
(Continued)

FOREIGN PATENT DOCUMENTS

EP 1 782 136 A1 5/2007
WO 2006/026060 A1 3/2006

OTHER PUBLICATIONS

Jun. 7, 2016 Supplementary Search Report issued in European Patent Application No. 14785053.
Chu et al., "Model Predictive Control and Optimization for Papermaking Processes," ISBN 978-953-307-298-2. Retrieved from the Internet: <http://www.intechopen.com/download/get/type/pdfs/id/16069>.
(Continued)

*Primary Examiner* — Kenneth M Lo
*Assistant Examiner* — Mohammad A Rahman
(74) *Attorney, Agent, or Firm* — Oliff PLC (57) ABSTRACT

A controller of a process includes a resource consumption optimizer which receives sets of control actions for a plurality of actuators from an advanced process controller performing independent data processing with respect to the resource consumption optimizer, each set of control actions resulting in a set-specific combined control action effect. The resource consumption optimizer optimizes resource consumption associated with the sets of control actions by modifying at least one control action on the basis of resource consumption associated with the actuator performing the control action while keeping a difference between a combined control action effect of a modified control action set and a combined control action effect a received control action set set-specifically within an accepted range.

11 Claims, 4 Drawing Sheets

(56) References Cited

U.S. PATENT DOCUMENTS

| | | | | |
|---|---|---|---|---|
| 7,143,711 | B1* | 12/2006 | Wolske | B63B 39/061 |
| | | | | 114/285 |
| 7,636,915 | B1* | 12/2009 | DiVittorio | G05B 19/41835 |
| | | | | 700/90 |
| 7,878,178 | B2* | 2/2011 | Stewart | F02D 31/007 |
| | | | | 123/436 |
| 8,132,322 | B2* | 3/2012 | Zhen | H05K 13/08 |
| | | | | 29/755 |
| 8,909,384 | B1* | 12/2014 | Beitelmal | G05D 23/1919 |
| | | | | 700/19 |
| 2004/0260421 | A1* | 12/2004 | Persson | G05B 13/048 |
| | | | | 700/128 |
| 2005/0075738 | A1 | 4/2005 | Attarwala | |
| 2010/0082120 | A1* | 4/2010 | Stephenson | G05B 13/048 |
| | | | | 700/29 |
| 2011/0087420 | A1* | 4/2011 | Stewart | F02D 31/007 |
| | | | | 701/102 |
| 2011/0093128 | A1 | 4/2011 | Wang et al. | |
| 2011/0244919 | A1* | 10/2011 | Aller | G06K 9/00973 |
| | | | | 455/556.1 |
| 2013/0190898 | A1* | 7/2013 | Shilpiekandula | G05B 19/19 |
| | | | | 700/19 |
| 2013/0247601 | A1* | 9/2013 | Burns | F25B 5/02 |
| | | | | 62/115 |
| 2014/0212279 | A1* | 7/2014 | Boudebiza | F01D 25/14 |
| | | | | 415/176 |
| 2014/0354350 | A1* | 12/2014 | Bowers | H03F 3/195 |
| | | | | 327/564 |
| 2015/0309773 | A1* | 10/2015 | Gupta | G06F 8/36 |
| | | | | 717/107 |

OTHER PUBLICATIONS

Padhiyar et al., "Profile Control in Distributed Parameter Systems Using Lexicographic Optimization based MPC," Journal of Process Control, 2009, vol. 19, pp. 100-109.

Salani et al., "Lexicographic Multi-Objective Optimization for the Unit Commitment Problem and Economic Dispatch in a Microgrid," Retrieved from the Internet: <http://www.idsia.ch/idsiareport/IDSIA-05-11.pdf>.

Marler et al., "Survey of Multi-Objective Optimization Methods for Engineering," Struct Multidisc, Review Article, 2004, vol. 26, pp. 369-395.

Zheng et al., "Multi-Objective Nonlinear Model Predictive Control: Lexicographic Method," Retrieved from the Internet: <https://web/archive.org/web/20130316145847/http://www.intechopen.com>.

Willis et al., "Advanced Process Control," School of Chemical Engineering and Advanced Materials, Newcastle University, 2000, Retrieved from the Internet: <http://www.dsea.unipi.it/Members/balestrinow/CP/file/introd_APC_SPC.pdf>.

Wikipedia, "Advanced Process Controller," Retrieved from the Internet: <http://en.wikipedia.org/w/index.php?title=Advanced_process_control&oldid=541527405>.

Aug. 12, 2014 International Search Report issued in International Patent Application No. PCT/FI2014/050282.

Aug. 12, 2014 Written Opinion issued in International Patent Application No. PCT/FI2014/050282.

Mar. 13, 2014 Search Report issued in Finnish patent Application No. 20135404.

Dec. 7, 2017 Office Action issued in European Patent Application No. 14 785 053.1.

\* cited by examiner

OPTIMIZATION OF A PROCESS

FIELD

The invention relates to optimization of a process.

BACKGROUND

Moisture content of paper in a paper machine is typically controlled by a multivariable controller such as an MPC (Model Predictive Controller). On the basis of measurements, the multivariable controller outputs control actions i.e. manipulated variables which control a plurality of actuators which, in turn, regulate the process such that the moisture content of the paper is at a target level. Also other properties associated more generally with a sheet or web can be controlled in a corresponding manner. However, the operation of a machine having a process related to sheet production needs further development.

BRIEF DESCRIPTION

The object of the invention is to provide an improved solution. This is achieved by a controller of an embodiment.

The invention also relates to a method of controlling a process in accordance with an embodiment.

The invention further relates to a system of controlling a process in accordance with an embodiment.

Preferred embodiments of the invention are disclosed in the dependent claims.

The controller of the invention can control the process to reach the values determined by setpoint data with optimum use of resources.

LIST OF FIGURES

The invention will now be described in greater detail in connection with preferred embodiments, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide further embodiments. Moreover, words "comprising" and "including" should be understood as not limiting the described embodiments to consist of only those features that have been mentioned but such embodiments may contain also features/structures that have not been specifically mentioned.

It should be noted that while Figures illustrate various embodiments, they are simplified representations that only show some structures and/or functional entities. The connections shown in these Figures may refer to logical or physical connections. Interfaces between the various elements may be implemented with suitable interface technologies enabling interaction of functional sub-units. It is apparent to a person skilled in the art that the described apparatuses may also comprise other functions and structures. It should be appreciated that details of some functions, structures, and the protocols used for interaction are irrelevant to the actual invention. Therefore, they need not be discussed in more detail here. Although separate single entities have been depicted, different parts may be implemented in one or more physical or logical entities.

Figure 1:
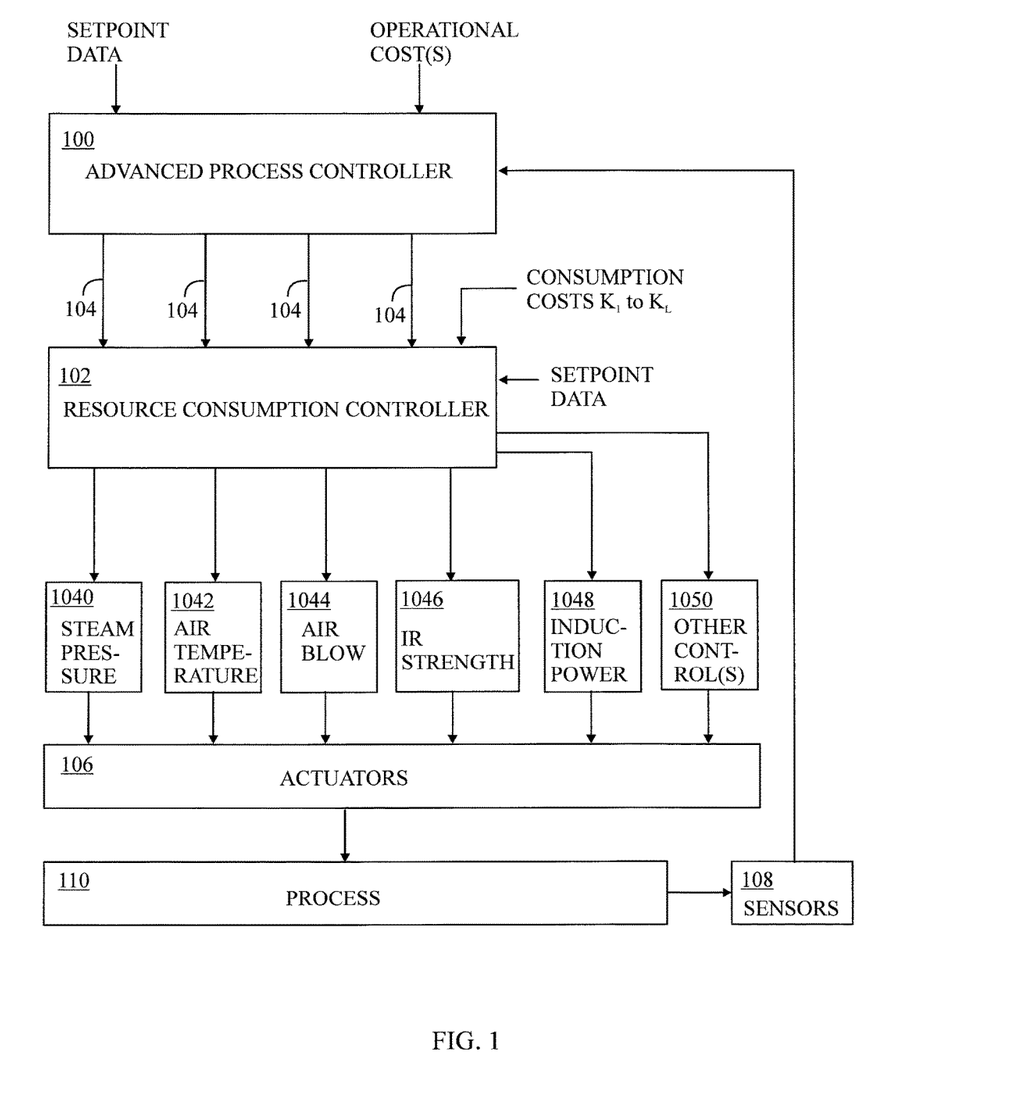
FIG. 1 illustrates an example of a principle of a process control.

FIG. 1 presents an advanced process controller 100 and a resource consumption optimizer 102 which may reside in a common system controller or in physically different controllers forming the system controller. In any case, the advanced process controller 100 performs independent data processing with respect to that of the resource consumption optimizer 102. The independent data processing means that there is no internal influence or control between the advanced process controller 20 and the resource consumption optimizer 102. It can also be determined that the resource consumption optimizer 102 performs autonomous data processing with respect to that of the advanced process controller 100. The independent data processing also means that the forming of a set of control actions in the advanced process controller 100 is not integrated with the optimization performed in the resource consumption optimizer 102. However, the advanced process controller 100 and the resource consumption optimizer 102 may or may not be physically close to each other or even mixed or integrated together.

The process controller 100 may comprise, for instance, a PID (Proportional-Integral-Derivative), an MPC (Model Predictive Control) or a GPC (General Predictive Control) controller. The process 110 may deal with processing of sheet or pulp which may comprise fibres of cellulose or the like. The processing of sheet or pulp may refer to manufacturing or other processing. Pulp may be refined for example. The advanced process controller 100 receives measured data from sensors 108 which measure the state of the process 110. The advanced process controller 100 receives or has available a setpoint vector, each element of which has a direct or indirect correspondence with a desired value of a property in the state of the process 110. A setpoint may refer to parameters such as moisture, temperature, porosity, gloss etc. The setpoints may also have an acceptable variation range between a maximum value and a minimum value. The advanced process controller 100 receives or has available operational cost(s) which may depend on efficiency of an actuator to perform an effect to states of the process 110.

The advanced process controller 100 forms sets of control actions 104 for a plurality of actuators 106 without an economic and/or energy consumption point of view associated with the use of the actuators 106 which regulate various properties of the process 110 in order to have an end product with desired quality. The advanced process controller 100 forms the control actions 104 repeatedly in an iterative manner on the basis of measurement data setpoint(s), operational cost(s) and constraints. A constraint means that a power such as a drying power of an actuator is limited between a certain range $P_{MIN} \leq P \leq P_{MAX}$. Additionally, the advanced process controller 100 may have a model of the process which may be used to predict future behaviour of the process 110 in each repeated iteration of the control actions 104 and the states. The control actions 104 are meant to give new operating settings to the plurality of actuators 106. The new operating settings may be the same as the previous ones or the new operating settings may be different from the previous ones. New control actions 104 may carry information about a deviation with respect the present settings.

In an embodiment, the advanced process controller 100 may comprise at least one processor and at least one memory including a computer program code, wherein the at least one memory and the computer program code are configured to cause, with the at least one processor, the advanced process controller 100 to form the sets of control actions 104.

As to mathematics of controlling, the computations of the advanced process controller 100 may be expressed as an optimization algorithm such that the predicted error of a property such as moisture with respect to setpoint data is minimized subject to a set of actuator constraints. That is, the control action change Δu may be such that the following cost function J may be minimized iteratively at each moment of prediction:

$$J = \Sigma_{i=hmin}^{hmax}[e_{PM}^2(t+i) \cdot W_{PM}^2] + \Sigma_{j=0}^{hcon}[\Delta u_{STP}^2(t+j) \cdot W_{STP}^2],$$

where
hmin=minimum horizon of prediction,
hmax=maximum horizon of prediction,
hcon=control horizon,
$e_{PM}(i)$=error of measured property at moment i of prediction,
$\Delta u_{STP}(j)$=change of control variable of actuators at moment j,
$W_{PM}$=weighting coefficient of measured property,
$W_{STP}$=weight of an actuator
t=time.

The change of control variable $\Delta u_{STP}(j)$ of an actuator refers to a deviation of a new control action from a control action that caused the present setting of said actuator, which corresponds to a control action change Δmv, where letters my refer to a manipulated variable which is another name for the control action. The control action effect may change the state of the process or it may keep it unchanged. A property which is measured and controlled may be moisture, ash content, color components of the sheet, for example. In case of control of moisture of the sheet, actuators regulating the moisture and corresponding manipulated variables may comprise at least one drying cylinder, steam pressure of drying cylinder, vacuum of vacuum roll, impingement dryer, infrared drier, or the like, for example.

Each set of control actions 104 results in a set-specific combined control action effect ΔCV, where letters cv refer controlled variable i.e. variable to be controlled. That is, each new iteration of control actions 104 has its impact to a total control change to be carried out by the actuators 106, and the combined control action effect ΔCV i.e. the total effect is a sum of effects of individual control actions $\Sigma_{i=1}^n[G_i\Delta mv_i]$ i.e. $\Delta CV = \Sigma_{i=1}^n[G_i\Delta mv_i]$, where $G_i$ denotes the weight or process gain for a control action change $\Delta mv_i$ given by advanced process controller 100.

The advanced process controller 100, however, does not take into account resource consumption related to the operation of the actuators 106, i.e. the operational cost weight of an actuator $W_{STP}$ namely only takes into account the efficiency or ability of the actuator to perform a state change in the process, but pays no attention to energy and/or raw material consumption of the actuator and its economic cost for realizing the effect. Thus, the resource consumption refers to energy consumption, raw material consumption and/or money consumption.

The resource consumption optimizer 102 receives at least one set of control actions 104 from the advanced process controller 100. The sets may be received one after another. The resource consumption optimizer 102 also receives or has available consumption costs $K_1$ to $K_L$ for each control action change which depend on resource consumption of the actual actuator performing the control action, where the number of actuators is L, L≥2. The resource consumption optimizer 102 may receive or have available the setpoint data. The resource consumption optimizer 102 may receive or have available constraints. Because different actuators have different power and thus resource consumption, their operation may be optimized with that respect. The resource consumption optimizer 102 then optimizes resource consumption associated with the set of control actions 104 by modifying at least one control action 104 on the basis of resource consumption associated with the actual actuator which performs said control action 104. At the same time, the resource consumption optimizer 102 keeps a difference between a set-specific combined control action effect attainable by a modified control action set and the set-specific combined control action effect attainable by received control action set within an accepted range. The range may be symmetrical or asymmetrical. The accepted range may be a predetermined range. Thus the resource consumption optimizer 102 has the purpose to keep each combined control action effect set-specifically the same or at least approximately the same as it was before the optimization was done in the resource consumption optimizer 102.

That is, the sum of effects associated with the modified control actions 1040 to 1050 after the optimization performed by the resource consumption optimizer 102 is the same as the sum of effects associated with the control actions 104 between the process controller 100 and the resource consumption optimizer 102. Different sets of control actions 104, and the corresponding modified control actions 1040 to 1050, however, may have different combined control action changes. Then the resource consumption optimizer 102 outputs modified control actions 1040, 1042, 1044, 1046, 1048, 1050 to different actuators 110.

In an embodiment, the resource consumption optimizer 102 may comprise at least one processor; and at least one memory including a computer program code, wherein the at least one memory and the computer program code are configured, with the at least one processor, to cause the resource consumption optimizer at least to perform the steps needed for and/or described about the optimization.

The operation of the resource consumption optimizer 102 may be expressed canonically in a mathematical form as follows:

$$z(x) = c^T x,$$

where z denotes a cost function to be optimized, x denotes variables to be determined, c denotes coefficients and T denotes a transpose of a vector or matrix. Here x may be expressed as Δmv, which denotes a change of a control action 104 received from the advanced process controller 100 by the resource consumption optimizer 102. A combined control action change ΔCV may be expressed as $\Delta CV = \Sigma_{i=1}^N G_i \Delta mv_i$, where N is the number of the control action changes. The number N associated with control actions may the same as the number K associated with actuators. Each coefficient element c is a cost coefficient for the corresponding variable x. Each element of x may be changed in the optimization of resource consumption optimizer 102 such that the combined value of the cost function z is optimized.

There are constraints associated with the optimization. The constraints may be expressed as:

$$g_i(x)=0, i \in I^0$$

$$g_j(x) \leq 0, j \in I^-$$

$$g_k(x) \geq 0, k \in I^+$$

$I^0 \cup I^- \cup I^+$ composes all the constraints, where U represents union.

A sum of effects $\Sigma_{i=1}^n[G_i \Delta mv_i]$ i.e. the combined effect $\Delta CV$ of the modified control actions 1040 to 1050, which means changes in this case, for the different actuators 110 output by the resource consumption optimizer 102 is the same as the sum of effects i.e. changes $\Sigma_{i=1}^n[G_i \Delta mv_i]$ associated with the control actions 104 output by the advanced process controller 100. Mathematically this may be expressed as:

$$g_i(x) = \Sigma_{i=1}^n G_i x_i - \Delta CV = 0$$

$$z(x) = \Sigma_{i=1}^n K_i x_i$$

where z is the cost function to be optimized, $G_i$ is a process gain for a control action change $x_i$ given by advanced process controller 100 and $K_i$ is a cost resource gain for a control action change $\Delta mv_i$ given by resource consumption controller 102, and n is the number of control actions. The weights K may be time dependent and thus the control action output by the resource consumption controller 102 may vary over time. The coefficient $K_i$ may be understood as a price or a cost associated with resources for causing an effect by a manipulated variable. In this way, the resource consumption optimizer 102 maintains the optimum over all control actions although the emphasis with respect to the actuators may vary.

That the effect formed by the advanced process controller 100 is kept unchanged in the optimization of the resource consumption optimizer 100 may also be expressed as:

$$\Delta CV = \Sigma_{i=1}^n[G_i \Delta mv_i] = \Sigma_{i=1}^n[G_i \Delta x_i].$$

The control performed by the resource consumption optimizer 102 is reliable and rapid because it solves only the problem related to the resource consumption caused by the actuators 106. The resource consumption optimizer 102 does not need to form control action effects related to a plurality of technical and other process issues which, on the other hand, are processed in and received in a prepared form from the advanced process controller 100. If one attempts to combine the data processing of the advanced process controller 100 and the data processing of the resource consumption optimizer 102, it will lead to serious problems because such integration is difficult to balance between two uncorrelated features i.e. resource consumption and process state with common weights. If one attempts to perform the data processing of the advanced process controller 100 and the data processing of the resource consumption optimizer 102 in a reverse order, it will also lead to serious problems because too heavy emphasis may be put on the least consuming actuators which may lead to loss of target in the process.

During steady state, a power consumption changes associated with the actuators causing a desired effect to the process are typically small. Thus even one actuator can realize the required effect. In normal drive, the required effect is thus optimized with respect to resource consumption and realized by actuators. In major operating point changes like in a grade change, a large power change $\Delta P_G$ is typically caused by the actuators for realizing a desired effect. There may be an actuator which can cause the effect alone but its resource consumption is usually so large that it is not acceptable and/or sensible. For example, a steam heater can make large changes in its heat output but it also consumes a lot of energy and the required effect causes a large peak in the resource consumption. On the other hand, many actuators which use much less resources cannot alone provide the needed effect because the power change $\Delta P_G$ needed to realize the effect is out of range of such an actuator. For example, an air drier cannot be used alone in a grade change. That is why it is practical to combine the use of various actuators such that their resource consumption is optimized.

When a grade change or other greater change in the process 110 is performed or takes place, the needed effects caused by control actions are typically so large that the resource consumption controller 102 does actually rather little to the control actions received from the advanced process controller 100. Still, the resource consumption controller 102 forms modified control actions by giving new weights to the control actions within the constraints of the actuators.

The resource consumption may refer to consumption of energy. Alternatively or additionally, the resource consumption may be considered as consumption of money. Still alternatively or additionally, the resource consumption may be considered as consumption of raw material.

In an embodiment, the resource consumption optimizer 102 may perform the optimization by selecting weights $K_i$ for some of or all the control actions while keeping the combined control action effect $\Delta CV$ (after) of said set after the optimization the same as the combined control action effect $\Delta CV$ (prior) of a set prior to the optimization.

In an embodiment, the consumption optimizer 102 may comprise a linear programming optimizer. Linear programming is a mathematical method and it may also be called linear optimization. Linear programming searches for a best result on a basis of a model of the process 110 while representing relationships associated with multivariables as linear. The best result may refer to a lowest cost and/or lowest energy consumption.

In an embodiment, the optimization may be performed using a per se known Simplex algorithm, for example.

In an embodiment, a machine for paper processing may comprise the resource consumption optimizer 102. In an embodiment, the machine for paper processing comprises at least one of the following: a paper machine, a pulp machine, a board machine, a coating machine, a printing machine.

Figure 2:
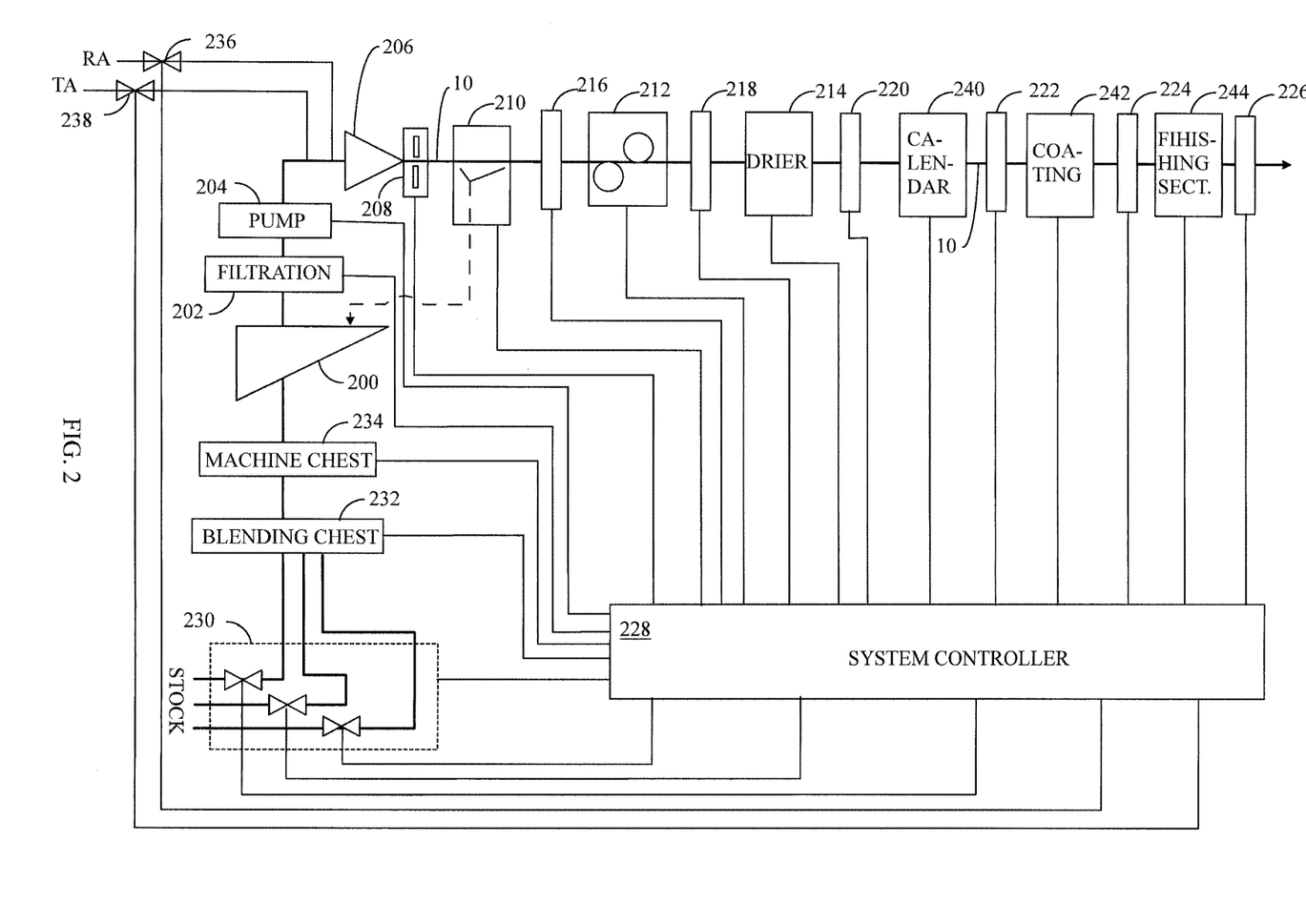
FIG. 2 shows an example of a paper machine.

Examine now a process where the above described control arrangement may be applied. FIG. 2 shows an example of a paper machine with a coating machine and this example describes measurement of moisture and its use in control of a machine associated with paper. Moisture may be measured as mass per area [kg/m²] or as density [kg/m³]. In this solution, the process 110 refers to paper or board manufacturing and an object of measurement is a paper web 10. One or more stocks are fed onto a paper machine through a wire pit silo 200, which is usually preceded by a blending chest 232 for partial stocks and a machine chest 234. The machine stock is dispensed for a short circulation, for instance, controlled by a basis weight control or a grade change program. The blending chest 232 and the machine chest 234 may also be replaced by a separate mixing reactor (not shown in FIG. 2), and the dispensing of the machine stock is controlled by feeding each partial stock separately by means of valves or another flow control means 230. In the wire pit silo 200, water is mixed into the machine stock to obtain a desired consistency for the short circulation (dashed line from a former 210 to the wire pit silo 200). From the obtained stock it is possible to remove sand (centrifugal cleaners), air (deculator) and other coarse material (pressure filter) using cleaning devices 202, and the stock is pumped with a pump 204 to a headbox 206. Before the headbox 206, it is possible to add to the stock, in a desired manner, a filler TA, including e.g. gypsum, kaolin, calcium carbonate, talcum, chalk, titanium dioxide and diatomite etc. and/or a retention agent RA, such as inorganic, inartificial organic or synthetic water-soluble organic polymers. The fillers may be used to reduce the porosity in the paper web, for instance. The retention agents RA, in turn, increase the retention of the fines and fillers while speeding up dewatering in a manner known per se. Both the fillers and the retention agents thus affect the moisture contents and structural properties of the paper web 10.

From the headbox 206 the stock is fed through a slice opening 208 of the headbox to a former 210, which may be a fourdrinier wire or a gap former. In the former 210, water is drained out of the web 10 and additionally ash, fines and fibres are led to the short circulation. In the former 210, the stock is fed as a web 10 onto a wire, and the web 10 is preliminarily dried and pressed in a press 212, which affects moisture content and porosity of the web 10, for example. The web 10 is actually dried in driers 214. Conventionally, the paper machine comprises at least one measuring sensors 216 to 226 which may measure moisture and potentially other properties of the web 10, for instance. In the cross direction of the web 10 there may be a row of several measuring sensors for measuring a cross-directional properties of the web 10. Correspondingly, there may be a row of several measuring sensors in the machine direction of the web 10 for measuring a machine-directional properties of the web 10.

A system controller 228 including the advanced process controller 100 and the resource consumption optimizer 102 receives signals relating to the measurements made by sensors 216 to 226, and controls various actuators 208, 210, 212, 214, 230, 232, 234, 236, 238, 240, 242, 244 on the basis of the measurements and setpoint which defines the target. In an embodiment, a structure of the system controller 228 may comprise both the consumption optimizer 102 and the advanced controller 100 which comprises a model predictive controller for forming the sets of the control actions for the plurality of actuators 106 on the basis of measurement results from the process 110 using an independent data processing from that of the resource consumption optimizer 102.

The paper machine, which in connection with this application refers to paper or board machines, may also include a pre-calender 240, a coating section 242 and/or a finishing section 244. The finishing section 244 may have at least one calendar and a drier having similar principles to those with reference number 214. However, the paper machine and coating machine may be separate machines, too.

In the coating section 242, coating paste, which may contain e.g. gypsum, kaolin, talcum or carbonate, starch and/or latex, may be spread onto paper web 10.

In calendars 240 (244), where the uncoated or coated paper or board web 10 runs between the rolls pressing with desired force, it is possible to change the moisture contents of the web 10. In the calendars 240 (244), the properties of the paper web 10 may be changed by means of web moistening, temperature and nip pressure, for example, between the rolls such that the higher the pressure exerted on the web, the lower the moisture and/or porosity becomes and the smoother and glossier the paper will be. Moistening and raised temperature may further increase or decrease moisture value and reduce the porosity. In addition to this, it is clear that the operation of a paper machine is known per se to a person skilled in the art, and therefore, it need not be presented in greater detail in this context.

The system controller 228, which may perform signal processing, may control the process of the paper machine on the basis of the measurements such that properties of the paper/board 10 to be manufactured will meet the set requirements. The system controller 228 may also present the measured property values graphically and/or numerically on a desired scale and according to a desired standard on a display, for instance.

The system controller 228 may be conceived as a paper machine's control arrangement, or part thereof, based on automatic data processing. The system controller 228 may receive digital signals or convert the received analog signals to digital ones. The system controller 228 may comprise at least one microprocessor and memory and execute the signal processing and the paper machine control in accordance with appropriate computer programs.

In the drying parts 214, 224 may have at least one infrared drier, air drier and steam pressure cylinder or the like as an actuator, for example. Air dryers may be on-blowers and/or through-blowers. The differences of these actuators lie in functional characteristics such as efficiency, energy consumption and response times. The response time $t_{ra}$ of an infrared dryer is in the order of 1 second. The response time 4, of an air dryer is in the order of 1 minute. The response time t, of a steam dryer is in the order of 2 to 3 minutes. The energy consumption differ also in a similar manner. The steam drier consumes a highest amount of energy of these drying actuators. The air drier consumes energy between the steam drier and the infrared drier, and the infrared drier consumes energy the least. Because their energy comes in the form of on electricity the cost of which is the same irrespective of the actuator, their consumption of money follows directly their consumption of energy. That is why it is important to be able to select the most energy and cost effective actuator to perform the change in the state of the process 110.

Figure 3:
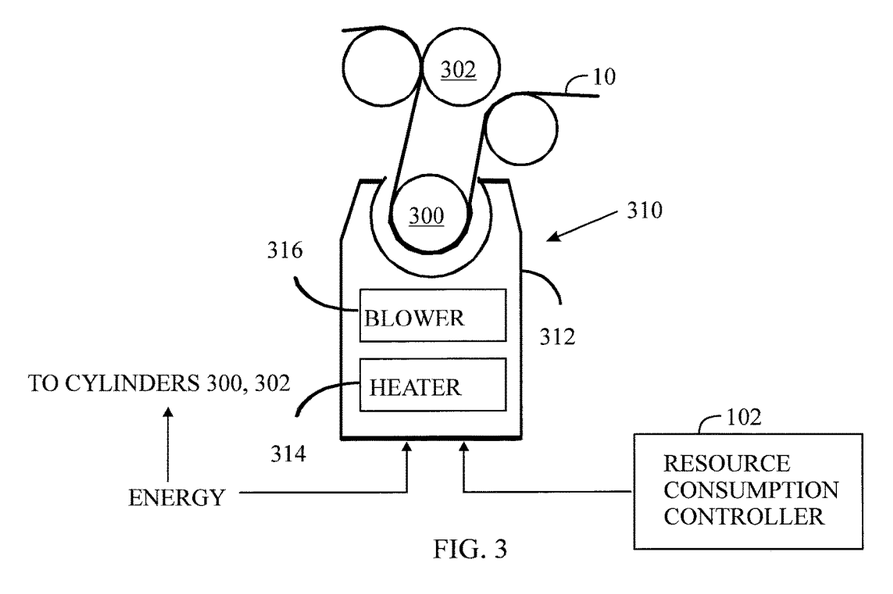
FIG. 3 shows an example of drying actuators.
Figure 4:
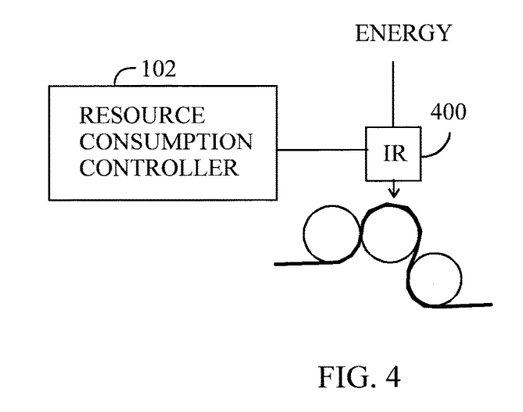
FIG. 4 shows an example of infrared drier.

Let us now study structural and operational principles of the drying part 214 of a paper machine and finishing section 244 of a coating machine closer by means of FIGS. 3 and 4. The drying part 214 may comprise at least one steam-heated cylinder 300. In an embodiment, the drying part 214, 244 may also comprise at least one vacuum cylinder 302. In an embodiment, the drying part 214, 244 may comprise one or more induction cylinder. In an embodiment, the drying part 214, 244 may comprise one or more air driers 310. In an embodiment, the drying part 214, 244 may comprise one or more infrared driers 400. The actuators 300, 302, 310, 400 may be controlled by the controller 228 which comprises the advanced process controller 100 and the resource consumption optimizer 102.

In an embodiment, a rotating cylinder 300 which is in contact with the web 10, may be steam heated and the drying power of the cylinder 300 may be adjusted by steam pressure supplied to the hollow cylinder. The more steam is supplied to the cylinder the hotter the cylinder becomes and the drier the web gets. The condensed water is then withdrawn from the cylinder 300. The drying of web 10 by the steam-heated cylinder 300 requires more energy and is thus more expensive than air drying and infrared drying. The energy/cost-in-money-ratio may depend on geographical location for example. The optimization may be tuned by setting proper values for weights in the cost function. The vacuum cylinder 302 may be used to suck moisture from the web 10. The more power is fed to a vacuum pump the lower pressure it creates to the vacuum cylinder 302 and drier the web 10 becomes.

In an embodiment, the air drier 310 may blow air towards the cylinder 300, which may in this embodiment be heated or not heated. In an embodiment, the cylinder 300 may be a suction roll. The air drier 310 may have a hood 312. The drying power of the air drier 310 may be increased by increasing temperature of the hot air in a heater 314 under control of the resource consumption controller 102. The drying power may be decreased by decreasing temperature of the hot air in a heater 314. Additionally or alternatively, the hot air flow [m$^3$/s] may be increased or decreased by a blower 316 to change the drying power under control of the resource consumption controller 102. The change in temperature and/or the air flow also changes energy consumption and money consumption. The drying part 214, 244 may also comprise one or more through-blowing units (not shown in Figures), wherein hot air is blown from the hood towards the web 10 on the surface of a rectifier roll. However, the drying principle is the same as with the on-blowing drier 310 such that the hotter and/or higher amount of air is blown the drier the web 10 becomes. The blowing can be intensified on the basis of the control in those locations of the web 10, wherein the mass of water in the web 10 is too large (i.e. moisture too high). Correspondingly, the drying can be decreased by means of the control at those locations of the web 10, wherein the web 10 is too dry.

In an embodiment, the cylinder 300 may be a rotating induction cylinder. When alternating electric current is fed under control of the resource consumption controller 102 to coils outside the surface of the cylinder 300, the alternating magnetic field caused by the alternating current induces eddy currents in inductive units of the cylinder 300 and heats them. By switching off or decreasing the current, the inductive units of the cylinder 300 become slowly cooler.

In an embodiment shown in FIG. 4, an infrared drier 400 outputs infrared radiation which transfers heat energy from the infrared drier 400 to the web 10 which may be on a cylinder or not. By feeding more electric energy to the infrared drier 400, the infrared drier 400 outputs more energy in the infrared band and the more infrared radiation is absorbed by the web 10 resulting in temperature rise in the web 10 which leads to drier web 10.

In an embodiment, nip pressure may be used to regulate the moisture content.

If too high drying power is used, paper may be damaged and/or too dry papers are statically electric causing them to adhere to each other which makes their handling difficult. If, on the other hand, too low drying power is used, the paper may again be damaged. These problems set constraints to the control actions for the actuators and the resource consumption optimizer 102 should limit the regulation of the actuators within the range of the constraints.

In general, any substance may be applied on paper such as a paste or ink. A proper drying method may also be used in a corresponding manner to dry ink printed on paper. For example, the not dry enough ink messes up everything. Hence, it is useful to optimize the drying power with respect to resources. The required drying power in any drying process depends on the moisture content of the at least one of the following: paper, paste, ink.

The use of each type of driers depends on their resource consumption. The resource consumption optimizer 102 uses a steam drier which is assumed least cost efficiency if other actuators which are assumed more cost efficiency cannot provide enough drying power. However, the resource consumption optimizer 102 keeps the use of the steam drier (or any other actuator of low cost efficiency) as low as possible while preferring cost efficient actuators.

Additionally or alternatively, also other properties of a paper web may be measured and controlled. Such a property may also be measured as mass per area [kg/m$^2$] or as density [kg/m$^3$], and the property may refer to dry mass for example. In an embodiment, the moisture may be measured in some other product than in paper in a process regulated by at least two actuators having different resource consumption.

In an embodiment, the sheet the production of which is controlled may be plastic, silicon, cloth, metal, glass or the like.

In an embodiment, the product which is in the process may be sewage, petrochemical substance such as oil, medicine, food or the like.

Common to all these potential solutions is the they have at least two actuators which consume at least one resource differently and a purpose is to optimize their technical operation and the resource consumption using two independent controllers (advanced process controller and resource consumption controller).

Figure 5:
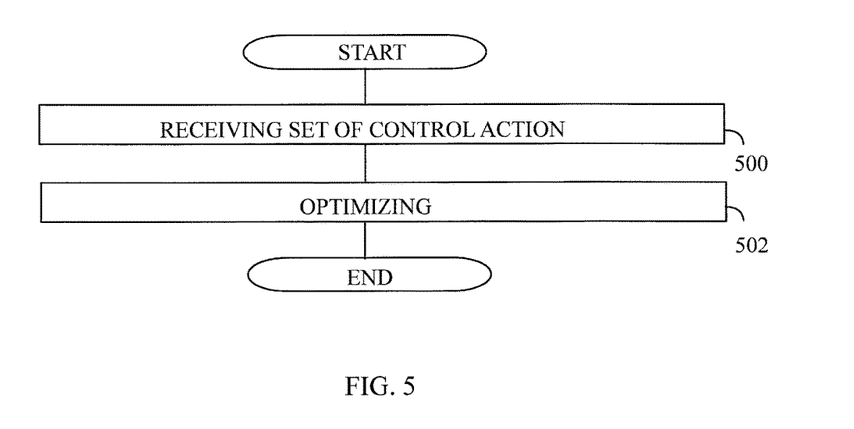
FIG. 5 shows an example of a flow chart of the control method.

FIG. 5 presents a flow chart of a control of a process. In step 500 a set of control actions for a plurality of actuators is received by a resource consumption optimizer from an advanced process controller performing independent data processing with respect to the resource consumption optimizer, said set of control actions resulting in a set-specific combined control action effect. In step 502, resource consumption associated with the set of control actions is optimized by modifying at least one control action of said set of control actions on the basis of resource consumption associated with an actuator performing said control action while keeping a difference between a set-specific combined control action effect attainable by a modified control action set and the set-specific combined control action effect attainable by said received control action within an accepted range.

The controllers 100, 102, 228 are capable of performing the steps presented in FIG. 5 and they may be implemented as an electronic digital computer, or a circuitry which may comprise a working memory (RAM), at least one central processing unit (CPU), and a system clock for each CPU. Each CPU may comprise a set of registers, an arithmetic logic unit, and a controlling unit. The controlling unit is controlled by a sequence of program instructions transferred to the CPU from the RAM. The controlling unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The controllers 100, 102, 228 may comprise circuitries which refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

As a further example, the term 'circuitry' would also cover an implementation of merely a processor (or multiple processors) or a portion of a processor and its (or their) accompanying software and/or firmware.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatuses associated with the controllers 100, 102 may also be implemented as one or more integrated circuits, such as application-specific integrated circuits ASIC (Application Specific Integrated Circuit). Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

Even though the invention is described above with reference to the examples of the attached drawings, it is clear that the invention is not restricted thereto, but it may be modified in a variety of ways within the scope of the accompanying claims.

The invention claimed is:

1. A controller of a paper/board/pulp process, wherein the controller of the paper/board/pulp process comprises a resource consumption optimizer configured to
   receive a set of control actions for a plurality of actuators set by an advanced process controller performing independent data processing with respect to the resource consumption optimizer, the set of control actions resulting in a set-specific combined control action effect; and
   optimize resource consumption of the plurality of actuators controlled with the set of control actions by modifying at least one control action of the set of control actions on the basis of resource consumption associated with an actuator performing the control action while keeping a difference between a set-specific combined control action effect attainable by a modified control action set and the set-specific combined control action effect attainable by the received control action set within a predetermined range,
   wherein:
      the resource consumption optimizer is configured to perform the optimization by selecting weights for at least one control action while keeping the set-specific combined control action effect attainable by the set of control actions after the optimization within the predetermined range as the combined control action effect of the set prior to the optimization, and the resource consumption optimizer is configured to control the plurality of actuators on the basis of the set of control actions, which are optimized with respect to resource consumption, and received by the plurality of actuators,
      the resource consumption optimizer only optimizes the already set set of control actions based on resource consumption without considering other control action effects,
         the controller comprises the advanced process controller which comprises a model predictive controller for forming the set of the control actions for the plurality of actuators on the basis of measurement results from the process using the independent data processing from that of the resource consumption optimizer, and
         the resource consumption is at least one of the following:
consumption of energy, consumption of money, consumption of raw material.

2. The controller of claim 1, wherein the consumption optimizer comprises a linear programming optimizer.

3. A machine for paper processing, wherein the machine for paper processing comprises the resource consumption optimizer of claim 1.

4. The machine of claim 3, wherein the machine comprises at least one of the following: a paper machine, a pulp drying machine, a coating machine.

5. A controller of a paper/board/pulp process, wherein the controller of the process comprises a resource consumption optimizer configured to
   receive a set of control actions for a plurality of actuators set by an advanced process controller performing independent data processing with respect to the resource consumption optimizer, the set of control actions resulting in a set-specific combined control action effect; and
   optimize resource consumption of the plurality of actuators controlled with the set of control actions by modifying at least one control action of the set of control actions on the basis of resource consumption associated with an actuator performing the control action while keeping a difference between a set-specific combined control action effect attainable by a modified control action set and the set-specific combined control action effect attainable by the received control action set within a predetermined range,
   wherein:
      the controller comprises the advanced process controller which comprises a model predictive controller for forming the set of the control actions for the plurality of actuators on the basis of measurement results from the process using the independent data processing from that of the resource consumption optimizer, and the resource consumption optimizer is configured to control the plurality of actuators on the basis of the set of control actions, which are optimized with respect to resource consumption, and received by the plurality of actuators,
      the resource consumption optimizer only optimizes the already set set of control actions based on resource consumption without considering other control action effects,
   and
      the resource consumption is at least one of the following:
consumption of energy, consumption of money, consumption of raw material.

6. The controller of claim 5, wherein the resource consumption optimizer is configured to perform the optimization by selecting weights for at least one control action while keeping the set-specific combined control action effect attainable by the set of control actions after the optimization within the predetermined range as the combined control action effect of the set prior to the optimization.

7. A method of controlling a paper/board/pulp process, comprising:
   receiving, in a resource consumption optimizer, a set of control actions for a plurality of actuators set by an advanced process controller performing independent data processing with respect to the resource consumption optimizer, the set of control actions resulting in a set-specific combined control action effect;
   optimizing resource consumption of the plurality of actuators controlled with the set of control actions by modifying at least one control action of the set of control actions on the basis of resource consumption associated with an actuator performing the control action while keeping a difference between a set-specific combined control action effect attainable by a modified control action set and the set-specific combined control action effect attainable by the received control action within a predetermined range;
   performing, using the resource consumption optimizer, the optimization by selecting weights for at least one control action while keeping the set-specific combined control action effect attainable by the set of control actions after the optimization within the predetermined range as the combined control action effect of the set prior to the optimization;
   forming, using a model predictive controller, the set of the control actions for the plurality of actuators on the basis of measurement results from the process using the independent data processing from that of the resource consumption optimizer; and
   controlling, using the resource consumption optimizer, the plurality of actuators on the basis of the set of control actions, which are optimized with respect to resource consumption, and received by the plurality of actuators,
   wherein:
      the resource consumption optimizer only optimizes the already set set of control actions based on resource consumption without considering other control action effects, and
      the resource consumption is at least one of the following:
   consumption of energy, consumption of money, consumption of raw material.

8. The method of claim 7, wherein performing the resource consumption optimizing occurs using a linear programming optimizer.

9. The method of claim 7, wherein forming the set of the control actions for the plurality of actuators on the basis of measurement results from the process using model predictive controlling independently from the resource consumption optimizing.

10. A resource consumption optimizer, wherein the resource consumption optimizer comprises:
   at least one processor; and
   at least one memory including a computer program code, wherein the at least one memory and the computer program code are configured, with the at least one processor, to cause the resource consumption optimizer at least to perform steps in the method of claim 7.

11. A system of controlling a paper/board/pulp process, wherein the system comprises an advanced process controller and a resource consumption optimizer,
   the advanced process controller being configured to set a set of control actions for a plurality of actuators, the set of control actions resulting in a set-specific combined control action effect;
   the advanced process controller being configured to perform independent data processing with respect to that of the resource consumption optimizer and form the set of the control actions for the plurality of actuators on the basis of measurement results from the process using the independent data processing from that of the resource consumption optimizer;
   the resource consumption optimizer being configured to
   receive the set of control actions from an advanced process controller, and
   optimize resource consumption of the plurality of actuators controlled with the set of control actions by modifying at least one control action of the set of control actions on the basis of resource consumption associated with an actuator performing the control action while keeping a difference between a set-specific combined control action effect attainable by a modified control action set and the combined control action effect attainable by received control action set within a predetermined range,
   perform the optimization by selecting weights for at least one control action while keeping the set-specific combined control action effect attainable by the set of control actions after the optimization within the predetermined range as the combined control action effect of the set prior to the optimization, and
   control the plurality of actuators on the basis of the set of control actions, which are optimized with respect to resource consumption, and received by the plurality of actuators,
   wherein:
      the resource consumption optimizer only optimizes the already set set of control actions based on resource consumption without considering other control action effects, and
      the resource consumption is at least one of the following:
   consumption of energy, consumption of money, consumption of raw material.

* * * * *